US010368315B2

(12) United States Patent
Niewczas

(10) Patent No.: US 10,368,315 B2
(45) Date of Patent: *Jul. 30, 2019

(54) USER-DEFINED COVERAGE OF MEDIA-PLAYER DEVICES ON ONLINE SOCIAL NETWORKS

(71) Applicant: Facebook, Inc., Menlo Park, CA (US)

(72) Inventor: Mateusz Marek Niewczas, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/925,616

(22) Filed: Mar. 19, 2018

(65) Prior Publication Data

US 2018/0220376 A1    Aug. 2, 2018

Related U.S. Application Data

(63) Continuation of application No. 15/240,910, filed on Aug. 18, 2016, now Pat. No. 9,924,470, which is a
(Continued)

(51) Int. Cl.
*H04W 52/18* (2009.01)
*H04W 52/28* (2009.01)
(Continued)

(52) U.S. Cl.
CPC .............. *H04W 52/18* (2013.01); *H04B 7/04* (2013.01); *H04B 7/06* (2013.01); *H04B 17/12* (2015.01); *H04B 17/318* (2015.01); *H04W 52/283* (2013.01); *H04W 52/42* (2013.01); *H04W 72/0473* (2013.01); *H04B 17/102* (2015.01); *H04L 67/306* (2013.01); *H04W 52/367* (2013.01); *H04W 72/005* (2013.01); *H04W 72/02* (2013.01); *H04W 72/0413* (2013.01)

(58) Field of Classification Search
CPC ........... H04W 52/00–60; H04W 72/02; H04W 72/005; H04W 72/0413; H04W 72/0473; H04B 7/04; H04B 7/06; H04B 17/12; H04B 17/318; H04B 17/102; H04L 67/306
See application file for complete search history.

(56) References Cited

U.S. PATENT DOCUMENTS

| 9,924,470 | B2 * | 3/2018 | Niewczas | H04W 52/18 |
| 2007/0169165 | A1 * | 7/2007 | Crull | G06F 17/3089 |
| | | | | 725/135 |
| 2010/0082727 | A1 * | 4/2010 | Zalewski | G09B 5/06 |
| | | | | 709/201 |

* cited by examiner

Primary Examiner — Raymond S Dean
(74) Attorney, Agent, or Firm — Baker Botts L.L.P.

(57) ABSTRACT

In one embodiment, a method includes detecting, by a media-player device including multiple antennas, a client system of a user is within a wireless communication range of the media-player device. In response to the detection, the media-player device broadcasts an authentication key for the user of the client system. The media-player device then registers the user to the media-player device based on the authentication key being verified by the client system. The media-player device further receives from the client system instructions to adjust a power level of each of the multiple antennas. The instructions are determined based on broadcast signals received at the client system and on a respective position of the client system associated with each received broadcast signal. The respective position of the client system is determined with respect to a position of the media-player device.

20 Claims, 10 Drawing Sheets

Related U.S. Application Data continuation of application No. 14/836,245, filed on Aug. 26, 2015, now Pat. No. 9,425,869.

(51) Int. Cl.
| | |
|---|---|
| *H04B 7/04* | (2017.01) |
| *H04W 52/42* | (2009.01) |
| *H04B 17/12* | (2015.01) |
| *H04B 17/318* | (2015.01) |
| *H04B 7/06* | (2006.01) |
| *H04W 72/04* | (2009.01) |
| *H04W 52/36* | (2009.01) |
| *H04B 17/10* | (2015.01) |
| *H04L 29/08* | (2006.01) |
| *H04W 72/00* | (2009.01) |
| *H04W 72/02* | (2009.01) |

USER-DEFINED COVERAGE OF MEDIA-PLAYER DEVICES ON ONLINE SOCIAL NETWORKS

PRIORITY

This application is a continuation under 35 U.S.C. § 120 of U.S. patent application Ser. No. 15/240,910, filed 18 Aug. 2016, which is a continuation under 35 U.S.C. § 120 of U.S. patent application Ser. No. 14/836,245, filed 26 Aug. 2015, issued as U.S. Pat. No. 9,425,869.

TECHNICAL FIELD

This disclosure generally relates to communicating with a media-player device, particularly within the context of an online social network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

SUMMARY OF PARTICULAR EMBODIMENTS

In particular embodiments, a social-networking system may authenticate a user to a media-device player when the user's client system is proximate to the media-device player in order to enhance the user's media-viewing experience. The media-player device may have social-networking functionality, and may communicate with a social-networking system. The media-device player may be coupled—via a wired or wireless connection—to a display screen (e.g., television), and the media-device player may provide streaming media content (e.g., television shows, movies, music, music videos, or any other suitable media content) for display on the display screen. As an example and not by way of limitation, the media-player device may retrieve the media content for streaming, via a wireless internet connection, directly from the content providers. A user may be seamlessly and securely authenticated to the media-player device based on a unique authentication key sent from the media-player device and received at the application on the client system. The authentication key may be generated by a social-networking system and sent to the media-player device, which, in turn, sends the authentication key to a user's client system that is in range of the media-player device's broadcast. An application on the user's client system may communicate with the social-networking system in order to verify that the authentication key is correct (i.e., not spoofed), and, in response to this verification, may send location information of the user's client system (e.g., location data acquired via Global Positioning System (GPS) functionality) and social-networking information of the user. The media-device player may then authenticate the user to the media-player device. As an example and not by way of limitation, the first user to be authenticated to a media-player device may be registered as the owner of the media-player device. The first user may then dictate, via settings of the media-player device, which other users may be authenticated as guest users when in range of the media-player device.

In particular embodiments, a range of each antenna of a media-player device may be adjusted based on the signal strengths of broadcast signals received from the antennas at an application running on a client system. As an example and not by way of limitation, a user who is authenticated to the media-player device (e.g., the owner) may initiate an application running on the user's client system in order to define the range of coverage of the media-player device. The application may receive broadcast signals from the antennas of the media-player device as the user walks around boundaries of a desired range of coverage (e.g., the perimeter of a room in which the media-player device is located). The application may determine the orientation of the client system with respect to the media-player device and, at various positions in the room, a signal strength of a broadcast signal received at the client system from an antenna of the media-player device. The application running on the user's client system may determine adjusted output power levels for the antennas based on the determined signal strengths. The application may send instructions to the media-player device to adjust the output power level of each antenna of the media-player device to the adjusted output power levels. In this manner, the user may set the desired range of coverage for the media-player device via the application running on the user's client system.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
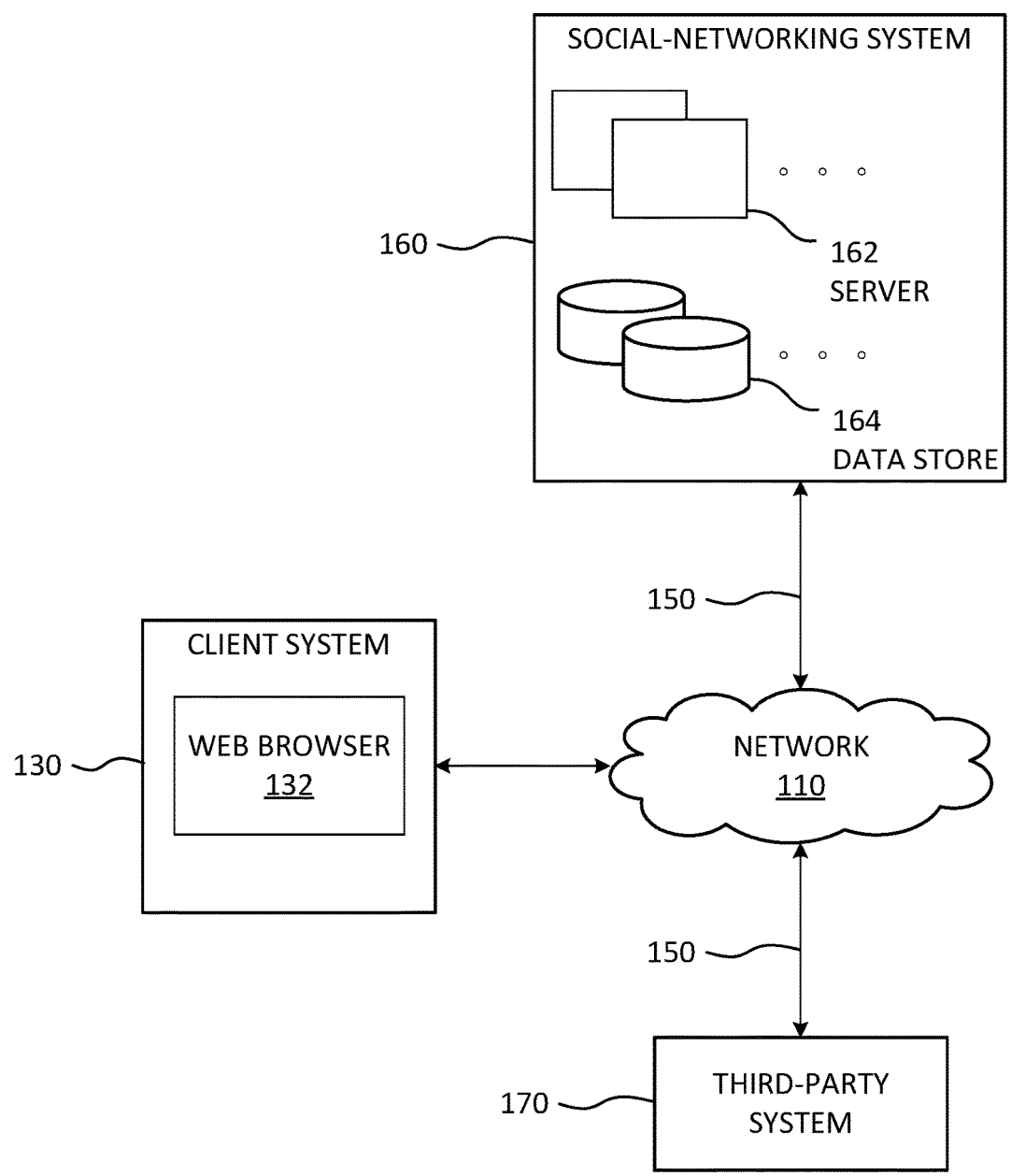
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., with which servers may communicate. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Social Graphs

Figure 2:
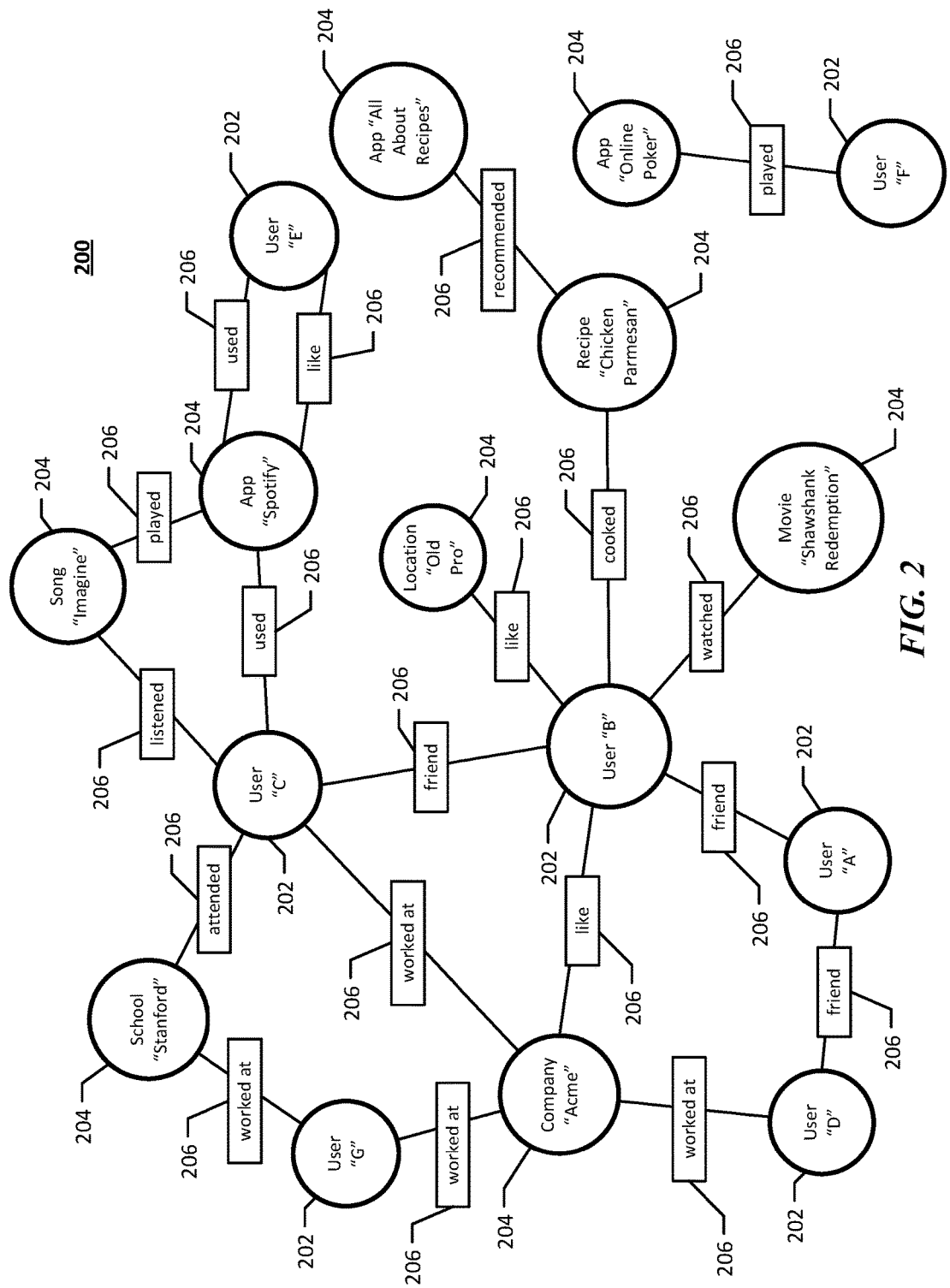
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Authenticating a User to a Media-Device Player

Particular embodiments facilitate the authentication of a user's client system 130 to a media-device player or other suitable geographic-positioning-capable devices or systems associated with social-networking system 160. As used herein, a media-player device may be any device suitable for wirelessly communicating with any number of client systems proximate to the media-player device. A media-player device may be communicatively-coupled, via a wireless or wired connection, to at least one display screen and able to communicate wirelessly with social-networking system 160. A media-player device may send and receive wireless communications via, for example, radio-frequency identification, near-field communication, ultrasonic waves, BLUETOOTH (e.g., short-range radio frequencies), BLUETOOTH low energy, or any other suitable wireless communication method, particularly short-range wireless communication methods (e.g., less than approximately 300 feet). Media-player devices may be touch-sensitive so as to detect when a user or client system makes contact with the surface of the media-player device and to authenticate a client system 130 to the media-player device in response to the detected touch. Media-player devices may have any of the hardware or software features of the types described in U.S. patent application Ser. No. 14/460,886, titled "Bluetooth Crowd-Sourced Triangulation," filed 15 Aug. 2014; U.S. patent application Ser. No. 14/460,880, titled "Bluetooth Transmission Security Pattern," filed 15 Aug. 2014; and U.S. patent application Ser. No. 14/460,891, titled "Bluetooth Beacon Protocol," filed 15 Aug. 2014; U.S. patent application Ser. No. 13/416,975, titled "Dynamic Processor Duty Cycle Determination Based on Geographic Positioning Signals," filed 9 Mar. 2012; U.S. patent application Ser. No. 13/417,013, titled "Location Tracking for Geographic Positioning Capable Devices," filed 9 Mar. 2012; and U.S. patent application Ser. No. 13/431,842, titled "Dynamic Geographic Beacons for Geographic Positioning Capable Devices," filed 27 Mar. 2012, each of which is incorporated by reference herein. A media-player device may be able to communicate wirelessly with one or more third-party content providers. Third-party content providers may be, for example and not by way of limitation, owners and/or distributors of media content (e.g., music and visual media content). When a user's client system 130 comes into range of a media-player device (e.g., a client system 130 may be in range of a media-player device if it is in range of at least one antenna of the media-player device and can receive a signal from the at least one antenna) or makes contact with the media-player device (e.g., the user taps the media-player device with her client system 130), client system 130 may be authenticated to the media-player device based on wireless communications between client system 130 and the media-player device. Client system 130 may be automatically authenticated to the media-player device in the background or confirmation from the user (e.g., a response to a prompt displayed via an application on the client system 130) may be required before the client system 130 is authenticated to the media-player device. Although this disclosure describes authenticating client system 130 to a media-player device in a particular manner, this disclosure contemplates establishing any suitable authentication in any suitable manner.

In particular embodiments, the media-player device may have any suitable number of antennas (e.g., directional antennas) for sending and receiving wireless communications. An application on a client system 130 may be used to define a range of each of the antennas based on the strength of signals received from the media-player device antennas at client system 130. Although this disclosure describes defining the range of the antennas of a media-player device in a particular manner, this disclosure contemplates defining the range of the antennas of the media-player device in any suitable manner.

Figure 3:
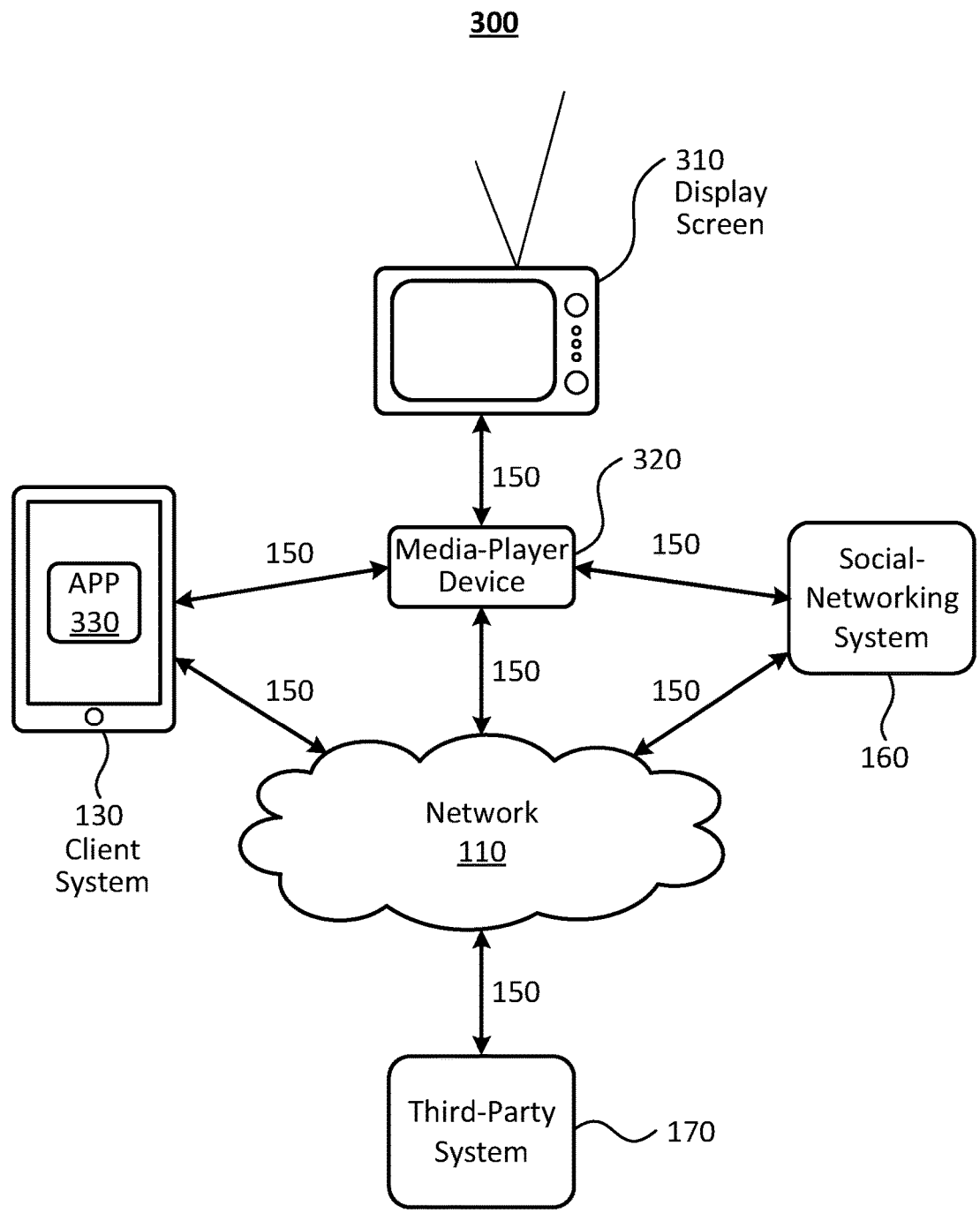
FIG. 3 illustrates an example media-player device environment associated with a social-networking system.

FIG. 3 illustrates an example media-player device environment 300 associated with a social-networking system 160. Media-player device environment 300 includes a media-player device 320, a display screen 310, a client system 130, a social-networking system 160, and a third-party system 170, each connected to a network 110. Media-player device 320 may be communicatively coupled to display screen 310 by a wired or wireless connection. Client system 130 and social-networking system 160 are shown as connected to each other by media-player device 320. Although FIG. 3 illustrates a particular arrangement of media-player device 320, display screen 310, client system 130, social-networking system 160, third-party system 170, and network 110, this disclosure contemplates any suitable arrangement of media-player device 320, display screen 310, client system 130, social-networking system 160, third-party system 170, and network 110. As an example and not by way of limitation, client system 130 and social-networking system 160 may be connected to each other directly, bypassing media-player device 320 and network 110. As another example, media-player device 320 and display screen 310 may be connected to each other via network 110. Although FIG. 3 illustrates one client system 130, any suitable number of client systems 130 may be authenticated to media-player device 320. As described above, in connection with FIG. 1, links 150 may connect media-player device 320, display screen 310, client system 130, social-networking system 160, and third-party system 170 to network 110 or to each other.

In particular embodiments, a user may be registered to a media-player device 320 in response to client system 130 of the user being authenticated to media-player device 320. Media-player device 320 may be situated at a designated location within a place (e.g., a living room) of a user of social-networking system 160 or a third-party (e.g., associated with third-party system 170). When media-player device 320 is first powered on (e.g., by the user who purchased media-player device 320), it may automatically enter a discovery mode. While in discovery mode, media-player device 320 may broadcast a signal for a predetermined period of time (e.g., a five-minute window). The broadcast signal may be, as an example and not by way of limitation, an authentication key generated by social-networking system 160. In particular embodiments, when media-player device 320 enters discovery mode, it may send, to social-networking system 160, a request for an authentication key. In particular embodiments, when media-player device 320 detects that client system 130 is within a wireless communication range of media-player device 320 (i.e., a user associated with client system 130 moves into range of media-player device 320), media-player device 320 may send, to social-networking system 160, a request for an authentication key. Social-networking system 160 may generate and send the authentication key to media-player device 320 in response to the request. The authentication key may be, as an example and not by way of limitation, an alphanumeric sequence or any suitable randomly-generated sequence. Media-player device 320 may send, to social-networking system 160, a request for a new authentication key for each new broadcast. As an example and not by way of limitation, for each unique broadcast (e.g., each five-minute broadcast while media-player device 320 is in discovery mode) media-player device 320 may broadcast a different unique authentication key retrieved from social-networking system 160. Media-player device 320 may broadcast the authentication key using, as an example and not by way of limitation, a short-range radio frequency (e.g., BLUETOOTH).

Client system 130 may receive the broadcast authentication key when client system 130 comes within range of media-player device 320 (e.g., the range may encompass a particular room in the user's house). In particular embodiments, in order to receive the authentication key, a native application 330 associated with social-networking system 160 must be running on the user's client system 130, and the user of client system 130 must be logged into an online social network via native application 330. Native application 330 may receive the authentication key sent from media-player device 320. As an example and not by way of limitation, media-player device 320 may broadcast an authentication key for one or more predetermined time intervals, and native application 330 running on client system 130 may receive the authentication key during the one or more predetermined time intervals. In particular embodiments, native application 330 may send the received authentication key to social-networking system 160 for verification. Because social-networking system 160 generates the authentication key that is broadcast by media-player device 320 and received by native application 330 running on client system 130, social-networking system 160 may verify the authentication key sent to social-networking system 160 by client system 130 (e.g., confirm that the authentication key sent by social-networking system 160 to media-player device 320 is the same alphanumeric sequence as the authentication key received by social-networking system 160 from client system 130). Thus, the authentication process is secure against spoofing attacks, because both ends of the authentication process, the generation of the authentication key and the verification of the authentication key by the native application 330, are associated with the social-networking system 160.

In response to verifying the authentication key with social-networking system 160, native application 330 may send location information of client system 130 and social-networking information of the user of client system 130 to media-player device 320. Location information may include, as an example and not by way of limitation, location information determined using GPS functionality or any other suitable geographic-positioning functionality. As another example and not by way of limitation, location information may be determined by social-networking system 160 based on social-networking actions taken by the user (e.g., the user checked-in at a page or event associated with a place at which the media-player is located). Social-networking information of a user may include, for example and not by way of limitation, demographic information (e.g., age, gender, nationality, race, ethnicity, and locality), biographic information (e.g., name, picture, birthday, and astrological sign), preferences (e.g., music, book, movie, and food preferences), payment credentials, purchase history, loyalty points or credits, allergies and other medical information, social-graph information (e.g., social connections within a threshold degree of separation in social graph 200 and social-networking information of those connections), any other information stored in a profile of the user on social-networking system 160, any other suitable information pertaining to the user, or any combination thereof. As another example and not by way of limitation, the set of social-networking information received by third-party system 170 may include identifiers of one or more second users who are connected to a first user of client system 130 in social graph 200 by a threshold degree of separation (e.g., first-degree connections may be "friends" of the first user).

Media-player device 320 may register the user to media-player device 320 based on the received location information of client system 130 and social-networking information of the user. In particular embodiments, media-player device 320 may only register the user to media-player device 320 if the location information of the user's client system 130 indicates that the user is within a threshold distance of media-player device 320 (e.g., within 100 feet). In particular embodiments, media-player device 320 may identify the user based on the received social-networking information and may register the user to media-player device 320 based on the determined identify of the user.

In particular embodiments, when media-player device 320 is first powered on (e.g., connected to display screen 310), the first user to be authenticated to media-player device 320 may be registered as the owner of media-player device 320. One or more additional users of social-networking system 160 may be registered as guest users of media-player device 320. Once the first user's client system 130 is authenticated to media-player device 320 and the user is registered as the owner of media-player device 320, the first user may specify, in settings, one or more second users of social-networking system 160 who may be registered as guest users of media-placer device 320 after their respective client systems 130 are each authenticated to media-player device 320. In particular embodiments, the first user may be prompted (e.g., at the first user's client system 130) to confirm authentication and/or registration of any second users before the authentication and/or registration is completed. As an example and not by way of limitation, a media-player device 320 may be registered to a first user— the registered owner of the media-player device 320—and a second user's client system 130 may come within range of media-player device 320. Media-player device 320 may retrieve and broadcast an authentication key, as described above, and an application 330 running on the client system 130 of the second user may verify the authentication key with social-networking system 160. Client system 130 may then send location information of the client system 130 of the second user and social-networking information of the second user to media-player device 320. Media-player device 320 may determine, based on the location information and the social-networking information of the second user whether to register the second user to the media-player device 320. In the same example, the first user may specify in settings of media-player device 320 that only first-degree connections in social graph 200 may be registered as guest users to media-player device 320. Media-player device 320 may determine, based on the social-networking information of the second user, that the second user is a first-degree connection of the first user in social graph 200 and may then register the second user to media-player device 320 as a guest user in accordance with the first-user's specified permissions.

In particular embodiments, the particular set of social-networking information of a user that is sent to media-player device 320 may be subject to a set of permissions (e.g., privacy preferences) specified by the user or other restrictions imposed by the online social network. The social-networking information of a user may be automatically shared with media-player device 320 in accordance with a user-specified set of permissions. The set of permissions may permit sharing of certain social-networking information of the user based on social-graph information (e.g., connections within a threshold degree of separation). As an example and not by way of limitation, the set of permissions may allow a set of social-networking information to be sent to media-player device 320 based on a degree of separation in social graph 200 between a node corresponding to a first user (i.e., registered owner) of media-player device 320 and a node corresponding to a second user.

In particular embodiments, once a user has been registered to a media-player device 320, media-player device 320 may tailor the displayed content of media-player device 320 to the registered user. The social-networking information of the registered user may be used by the media-player device to customize content (e.g., retrieved from one or more third-party content providers) for display to the registered user (e.g., via one or more display screens 310 communicatively coupled to the media-player device), as described in U.S. patent application Ser. No. 14/836,300, titled "Customizing Media Content on Online Social Networks," filed 26 Aug. 2015, which is incorporated by reference herein.

In particular embodiments, media-player device 320 may provide customized media content for display to the user (e.g., via display screen 310) if the user is registered to media-player device 320 and the user's client system 130 is in proximity to a media-player device 320 (e.g., in the same room as media-player device 320). In particular embodiments, media-player device 320 may provide customized media content for display to the user if the user is registered to media-player device 320 and the user's client system 130 is in an active wireless connection with media-player device 320 (e.g., client system 130 and media-player device 320 are paired via a BLUETOOTH connection). In particular embodiments, media-player device 320 may retrieve media content from one or more third-party content providers (e.g., an advertiser or a subscription-based media-content provider) and may determine what of the retrieved content is displayed to the user via display screen 310 based on social-networking information of the user. A client system 130 may be authenticated to and a user may be registered to media-player device 320 using any of the techniques described in U.S. patent application Ser. No. 14/836,206, titled "Authenticating Users to Media-Player Devices on Online Social Networks," filed 26 Aug. 2015, which is incorporated by reference herein.

Prompts and Confirmation

In particular embodiments, the process of authenticating and registering a client system and user to media-player device 320 may be seamless (i.e., it may not require any user input in order for the user's client system 130 to be authenticated to or for a user to be registered to media-player device 320). In particular embodiments, as described in connection with FIGS. 4A-4B, user input responding to a prompt may be required in order to complete the authentication of the client system and/or the registration of the user to media-player device 320.

Figure 4A:
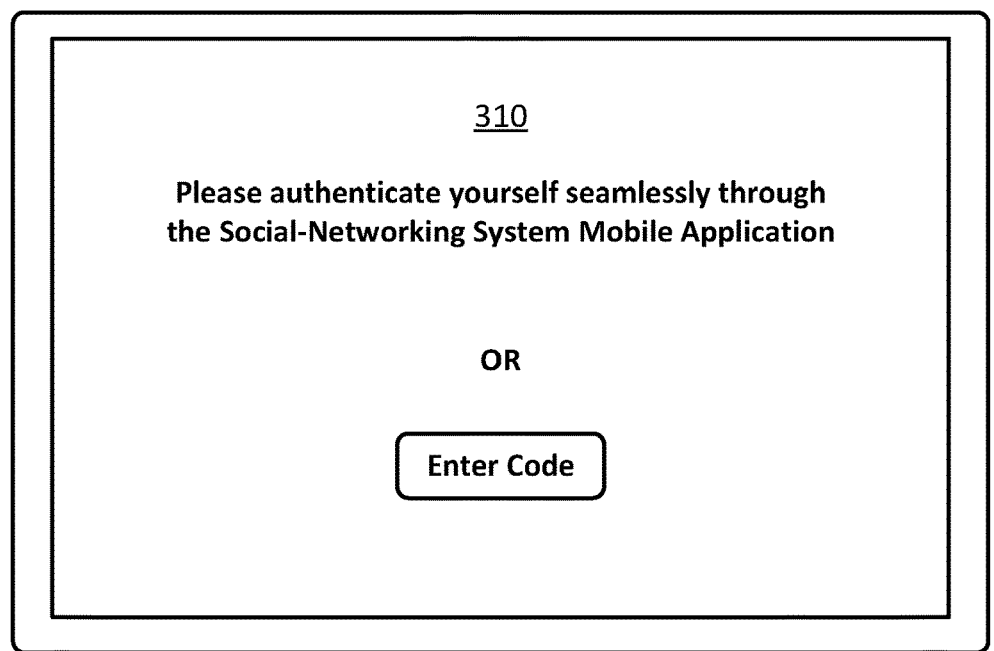
FIG. 4A illustrates an example view of a prompt to authenticate with a media-player device displayed on a client system.
Figure 4A:
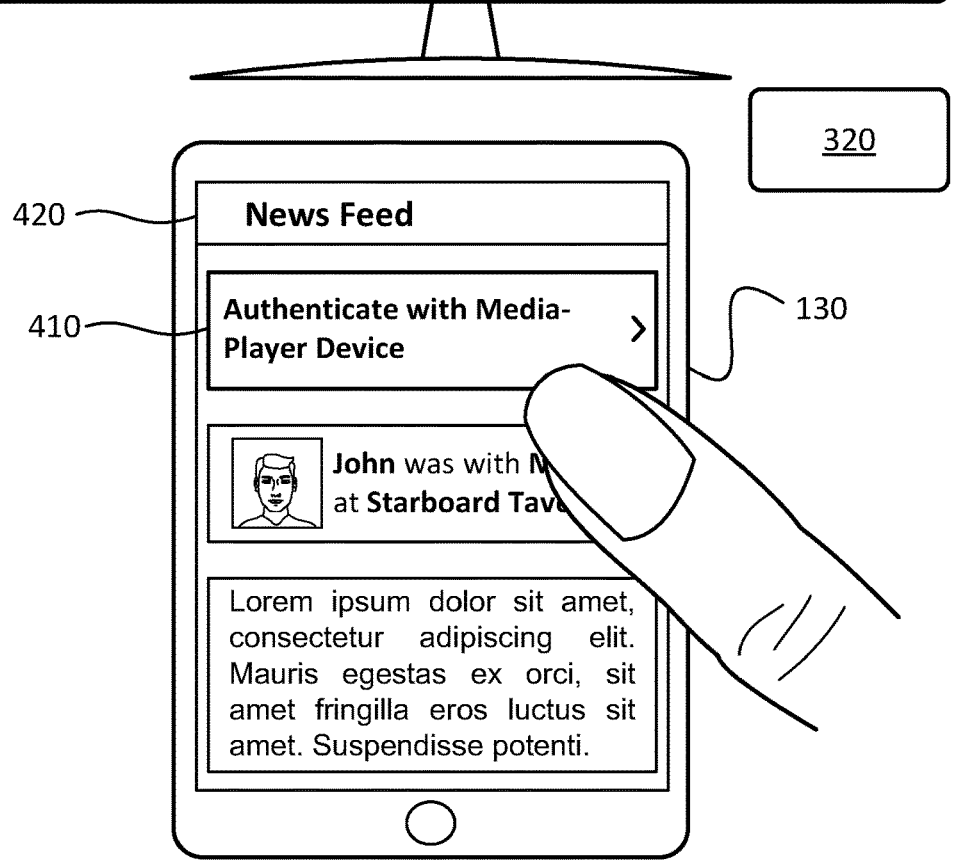

FIG. 4A illustrates an example view 400A of a prompt 410 to authenticate with a media-player device 320 displayed on a client system 130. In particular embodiments, the authentication key being received by native application 330 causes native application 330 to provide prompt 410 for display at an interface of client system 130. Prompt 410 may be a request for confirmation of authentication of client system 130 of the user to media-player device 320. The requested confirmation may be, as an example and not by way of limitation, a binary answer to a question posed by the prompt (e.g., "yes" or "no" in response to a request to register the user to media-player device 320). The requested confirmation may be inputted by the user at the client system 130. When the requested authentication is received at native application 330, native application 330 may complete the authentication process by verifying the received authentication key with social-networking system 160.

In particular embodiments, when prompt 410 is displayed at client system 130, media-player device 320 may cause an authentication screen to be displayed simultaneously at display screen 310. The authentication screen may provide, as an example and not by way of limitation, instructions to authenticate via prompt 410 at client system 130 or to enter a code or other credential at media-player device 320. The code may be, as an example and not by way of limitation, received at native application 330.

In particular embodiments, a user may specify, in settings, whether or not and how a prompt 410 may be displayed. As an example and not by way of limitation, native application 330 may be associated with social-networking system 160, and prompt 410 may be displayed in an interface of native application 330 (e.g., in news feed 420). Although described and depicted in a particular way, it will be understood that this is by way of illustration not by way of limitation, and prompt 410 may be any suitable type of prompt. As an example and not by way of limitation, prompt 410 may be a push notification provided on a lock screen of client system 130 or hovering over any suitable screen of client system 130. As another example and not by way of limitation, prompt 410 may be a type of reaction card, which may be presented to a user, of the type described in U.S. patent application Ser. No. 14/466,269, titled "Generating Cards in Response to User Actions on Online Social Networks" filed 22 Aug. 2014, which is incorporated herein by reference.

Figure 4B:
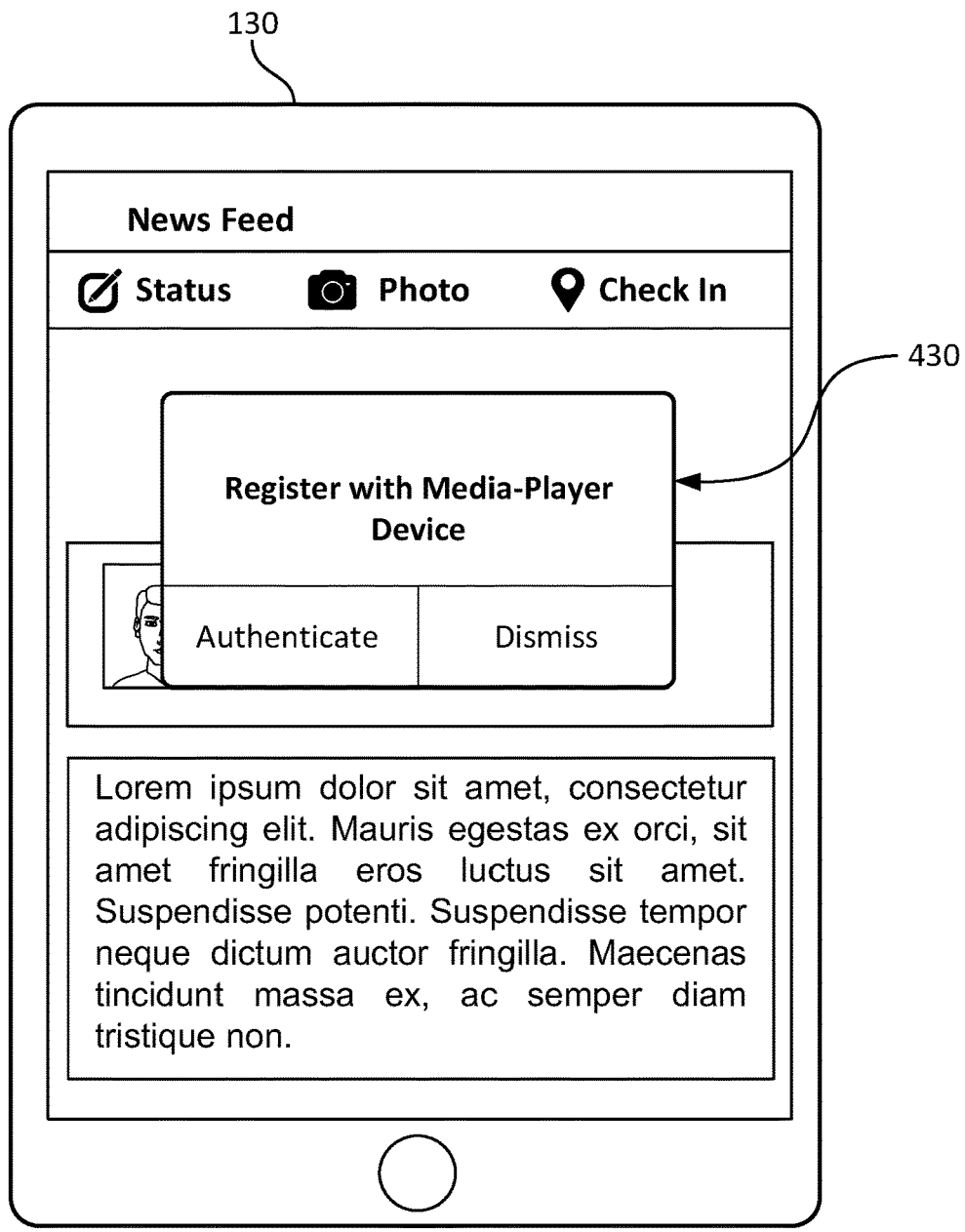
FIG. 4B illustrates an example view of a prompt to register with a media-player device displayed on a client system.

FIG. 4B illustrates an example view 400B of a prompt 430 to authenticate with a media-player device 320 displayed on a client system 130. In particular embodiments, the authentication key being verified by native application 330 causes native application 330 to provide prompt 430 for display at an interface of client system 130. The user of client system 130 may be registered as an owner of the media-player device 320 in response to the requested confirmation (i.e., requested by prompt 430) being inputted to the native application 330 by the user of client system 130. As described above, prompt 430 may be any suitable prompt, including, for example, a push notification. As another example and not by way of limitation, prompt 430 may be a message provided in a messaging application running on client system 130 (e.g., a messaging application associated with social-networking system 160). In this manner, a user of client system may confirm the authentication by sending a message in response to a message (e.g., prompt 430) in a message thread hosted by a messaging application running on the user's client system 130.

Although this disclosure describes and illustrates particular embodiments of FIGS. 4A-4B as being implemented by media-player device 320, this disclosure contemplates any suitable embodiments of FIGS. 4A-4B occurring on any suitable interface and as being implemented by any suitable platform or system. As an example, and not by way of limitation, particular embodiments of FIGS. 4A-4B may be implemented by client system 130. Furthermore, although this disclosure describes and illustrates particular components, devices, or systems carrying out particular steps of the method of FIGS. 4A-4B, this disclosure contemplates any suitable combination of any suitable components, devices, or systems carrying out any suitable steps of the method of FIGS. 4A-4B.

Defining the Coverage of a Media-Player Device

Once a user has been registered as an owner of media-player device 320, the user may define the range of media-player device 320. As an example and not by way of limitation, an application on a client system 130 of the user may communicate with antennas of media-player device 320 over BLUETOOTH in order to set a range of coverage of media-player device 320. Particular arrangements of antennas on a media-player device 320 and calibration of these antennas based on communications with an application on a user's client system 130 are described below in connection with FIGS. 5-6.

Figure 5:
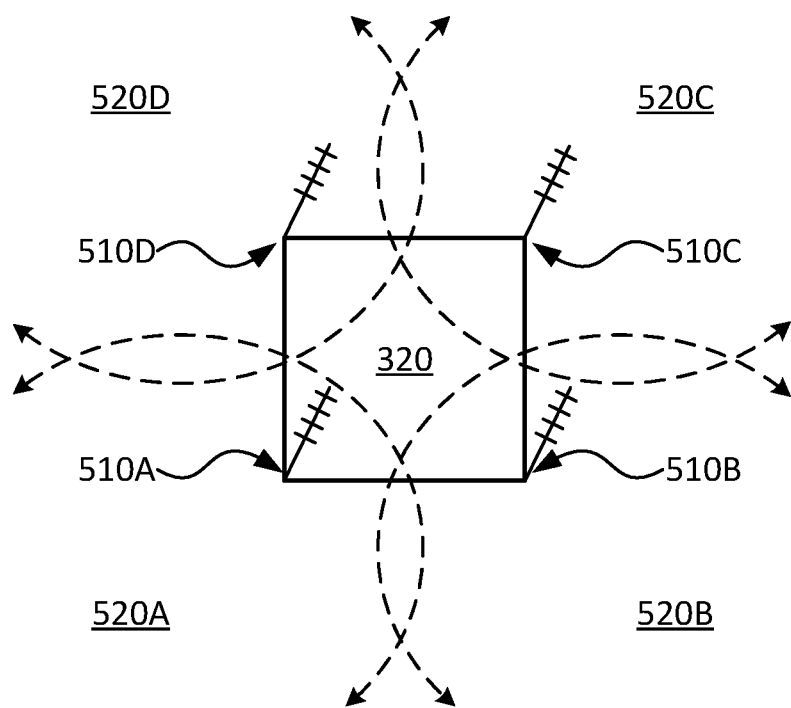
FIG. 5 illustrates an example media-player device.

FIG. 5 illustrates an example media-player device 320. Media-player device 320 may include any suitable number of antennas 510A, 510B, 510C, and 510D arranged in any suitable pattern on media-player device 320. In the illustrated example of FIG. 5, media-player device 320 has four antennas 510A, 510B, 510C, and 510D arranged such that one antenna is positioned at each corner of media-player device 320. Antennas 510A, 510B, 510C, and 510D may be any suitable types of antennas, including, for example, directional antennas. Although media-player device 320 is illustrated and described as having a certain number of antennas 510A, 510B, 510C, and 510D, it will be understood that media-player device 320 may include any suitable number of antennas 510A, 510B, 510C, and 510D. In particular embodiments, media-player device 320 may have a fifth antenna, which may be a bidirectional antenna or a directional antenna. In particular embodiments, media-player device 320 may have an array of antennas and may use beamforming techniques.

Antennas 510A, 510B, 510C, and 510D may have respective ranges 520A, 520B, 520C, and 520D. In other words, antennas 510A, 510B, 510C, and 510D may generate signals (e.g., BLUETOOTH signals) that have a respective range 520A, 520B, 520C, and 520D. In particular embodiments, one or more of antennas 510A, 510B, 510C, and 510D may generate a radiation pattern in a first plane (e.g., the first plane may horizontally bisect media-player device 320), and the radiation pattern may radiate in substantially 360-degrees of the first plane. As an example and not by way of limitation, the radiation pattern may provide coverage for the major part of a room in which the media-player device 320 is situated (e.g., 30 feet in every direction on the first plane). In particular embodiments, media-player device 320 may have a fifth antenna that is positioned on media-player device 320 such that it generates a radiation pattern that radiates in a second plane, where the second plane is substantially perpendicular to the first plane. As an example and not by way of limitation, antennas 510A, 510B, 510C, and 510D may be directional antennas that radiate in a plane horizontal to the ground, whereas the fifth antenna may be a bidirectional antenna that radiates in a plane perpendicular to the ground.

In particular embodiments, a user registered as an owner of media-player device 320 may, by an application running on the user's client system 130, define a range 520A, 520B, 520C, and 520D of each antenna 510A, 510B, 510C, and 510D. Once a user is registered to media-player device 320, a client system 130 of the user may send to the media-player device 320, an indication that the user is logged into the online social network via a native application 330 associated with the online social network 160. Client system 130 may send this indication when client system 130 is within range of at least one of the antennas 510A, 510B, 510C, and 510D of the media-player device 320. In response to receiving this indication, media-player device 320 may enter a calibration mode and set a power level of each of antennas 510A, 510B, 510C, and 510D to a maximum power level. Client system 130 may determine an orientation position of client system 130 with respect to media-player device 320. The orientation position may be determined based on one or more broadcast signals received from one or more of antennas 510A, 510B, 510C, and 510D of media-player device 320. As an example and not by way of limitation, client system 130 may determine that it has received broadcast signals only from antenna 510A and thus that it is in range 520A with respect to media-player device 320.

After the orientation position has been determined by client system 130, the user may walk a perimeter of a desired zone of coverage (e.g., an area to be covered by the combined ranges 520A, 520B, 520C, and 520D) with his client system 130, where the perimeter is defined by any suitable number of boundary positions on the user's walk. Client system 130 may be in calibration mode, listening for broadcast signals from antennas 510A, 510B, 510C, and 510D. Client system 130 may receive, from media-player device 320, at any suitable number of boundary positions, broadcast signals from one or more of antennas 510A, 510B, 510C, and 510D. Each boundary position may be in at least one of the ranges 520A, 520B, 520C, and 520D, and when client system 130 is in a particular range 520A, 520B, 520C, or 520D, it may receive a broadcast signal from the respective antenna 510A, 510B, 510C, or 510D. In particular embodiments, client system 130 receives at least one signal from at least one antenna 510A, 510B, 510C, and 510D while at a boundary position within the respective at least one range 520A, 520B, 520C, or 520D.

Client system 130 may calculate a signal strength for each of the received signals (e.g., a relative signal strength index (RSSI) value) using any suitable technique. Client system 130 may then determine, for each calculated RSSI value and for the particular make and model of client system 130, an output power level (e.g., in decibels (dB)) for the respective antenna from which each broadcast signal was received. In particular embodiments, client system 130 may transmit the determined RSSI values to social-networking system 160. Social-networking system 160 may have previously determined the make and model of client system 130 (e.g., IPHONE 5S) when native application 330 was downloaded to client system 130, so the signal strength for the particular client system 130 at various distances is known. Social-networking system 160 may use this information to create a device-to-antenna characterization plot. Social-networking system 160 may then correlate the RSSI values to output power levels for each of the antennas 510A, 510B, 510C, or 510D of media-player device 320 based on the device-to-antenna characterization plot for the particular make and model of client system 130.

Client system 130 may determine a low power level for a particular antenna 510A, 510B, 510C, or 510D when the determined signal strengths of broadcast signals received at boundary positions of client system 130 in range 520A, 520B, 520C, or 520D of the particular antenna being high values. Similarly, client system 130 may determine a high power level for a particular antenna 510A, 510B, 510C, or 510D when the determined signal strengths of broadcast signals received at boundary positions of client system 130 in range 520A, 520B, 520C, or 520D of the particular antenna being low values. The determined power levels may each be based on a lowest determined signal strength value for the respective antenna 510A, 510B, 510C, and 510D. As an example and not by way of limitation, client system 130 may receive more than one broadcast signal from antenna 510A while at one or more boundary positions within range 520A of antenna 510A, and client system 130 may determine signal strengths for each of those received broadcast signals. Client system 130 may determine the power level based on the lowest of the determined signal strengths. In particular embodiments, if no signal is received from one or more of antennas 510A, 510B, 510C, and 510D, meaning no signals strengths are determined for broadcast signals received from one or more of antennas 510A, 510B, 510C, and 510D, client system 130 may determine a power level of zero for the one or more antennas 510A, 510B, 510C, and 510D.

Client system 130 may then send, to media-player device 320, instructions to adjust a power level of each of antennas 510A, 510B, 510C, and 510D based on the determined signal strengths. Media-player device 320 may, in response to the instructions received from client system 130, adjust the power levels of antennas 510A, 510B, 510C, and 510D to define a range of broadcast of the antennas 510A, 510B, 510C, and 510D based on the orientation position and the boundary positions of the client system. Although described as defining the range of broadcast for four antennas 510A, 510B, 510C, and 510D, the user may, by way of client system 130, define the range for each of any suitable number of antennas.

Although this disclosure describes and illustrates particular embodiments of FIG. 5 as being implemented by client system 130, this disclosure contemplates any suitable embodiments of FIG. 5 occurring on any suitable interface and as being implemented by any suitable platform or system. As an example, and not by way of limitation, particular embodiments of FIG. 5 may be implemented by a native application running on client system 130. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
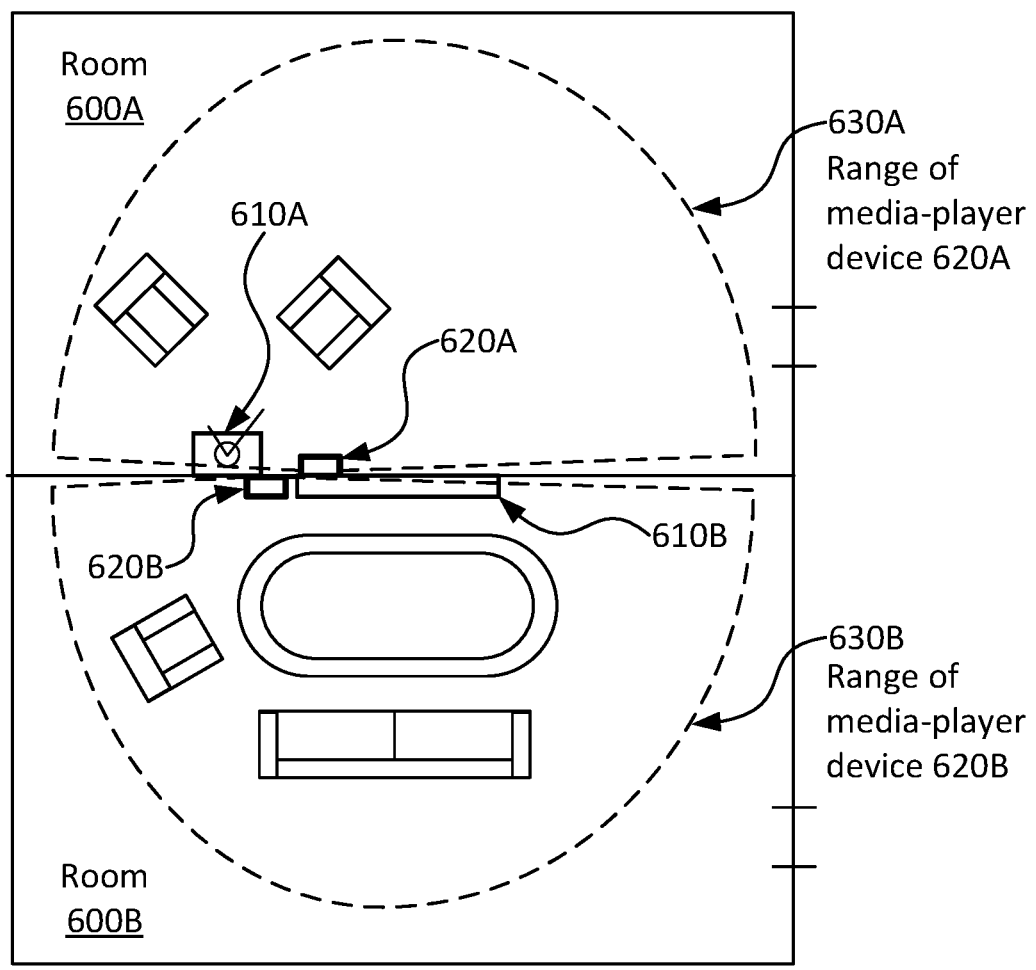
FIG. 6 illustrates example user-defined ranges of media-player devices.

FIG. 6 illustrates example user-defined ranges 630A and 630B of media-player devices 620A and 620B. Media-player device 620A is shown as being located within room 600A and connected, by a wired or wireless connection, to display screen 610A. Media-player device 620B is shown as being located within room 600B and connected, by a wired or wireless connection, to display screen 610B. Ranges 630A and 630B may correspond to the perimeters walked by the respective users of media-player devices 620A and 620B. By defining the perimeter of the rooms 600A and 600B as described above in connection with FIG. 5, undesired overlap between signals emanating from media-player device 620A and signals emanating from media-player device 620B may be avoided.

Although this disclosure describes and illustrates FIG. 6 as having two media-player devices 620A and 620B, this disclosure contemplates any suitable embodiments of FIG. 6 occurring on any suitable interface and as being implemented by any suitable platform or system. As an example, and not by way of limitation, particular embodiments of FIG. 6 may have any suitable number of media-player devices 620A and 620B. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
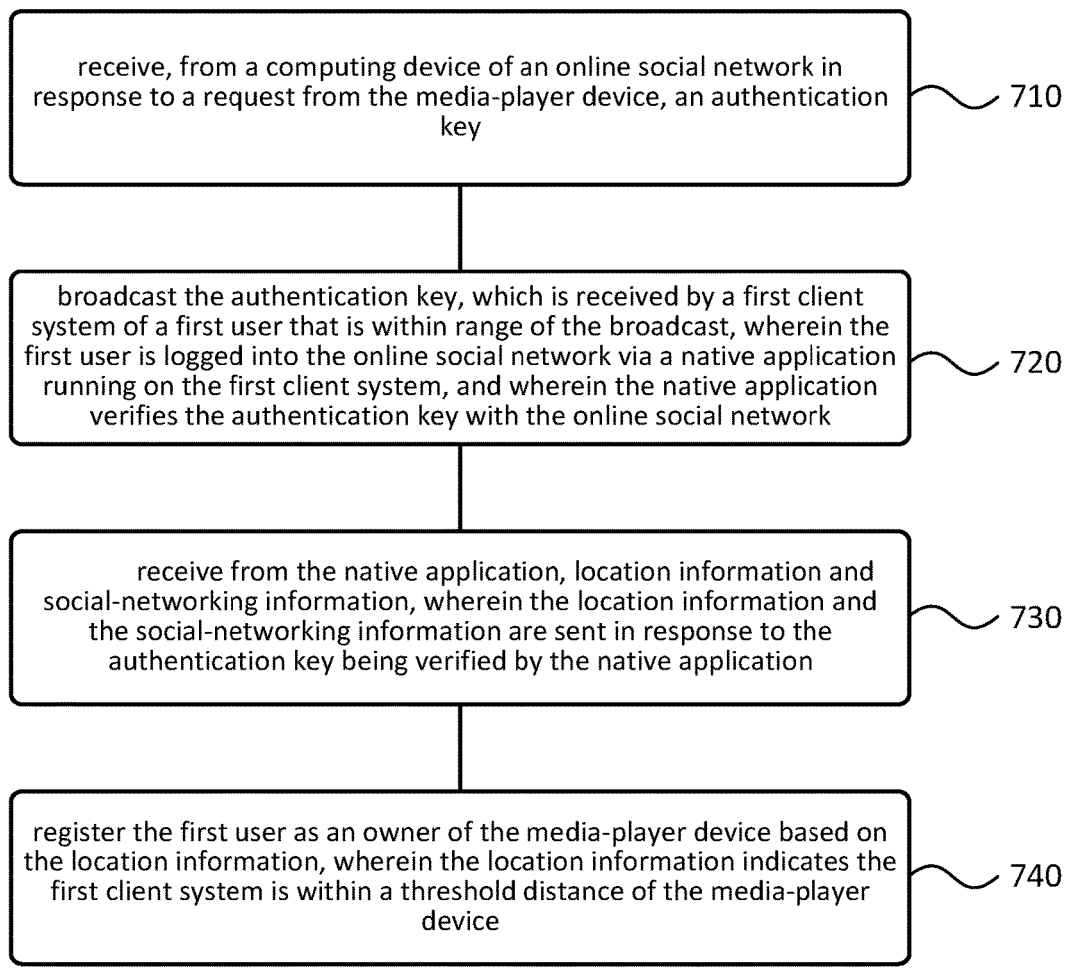
FIG. 7 illustrates an example method for registering a user as an owner of a media-player device.

FIG. 7 illustrates an example method 700 for registering a user as an owner of a media-player device 320. The method may begin at step 710, where media-device player 320 may receive, from social-networking system 160 in response to a request from media-player device 320, an authentication key. At step 720, media-player device 320 may broadcast the authentication key, the authentication key being received by first client system 130 of a first user of social-networking system 160, first client system 130 being within range of the broadcast, wherein first client system 130 is running a native application associated with social-networking system 160, the first user being logged into social-networking system 160 via the native application, and wherein the native application verifies the authentication key with social-networking system 160. At step 730, social-networking system 160 may generate a report, the report including aggregated social-networking information and aggregated session information of one or more of the first users, wherein the report is generated based on sets of permissions specified by each of the one or more first users. At step 740, media-player device 320 may receive, from the native application running on first client system 130, location information of first client system 130 and social-networking information of the first user, wherein the location information of first client system 130 and the social-networking information of the first user are sent in response to the authentication key being verified by the native application. At step 750, media-player device 320 may register the first user as an owner of media-player device 320 based on the location information of first client system 130 and the social-networking information of the first user, wherein the location information indicates first client system 130 is within a threshold distance of media-player device 320. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for registering a user as an owner of a media-player device 320 including the particular steps of the method of FIG. 7, this disclosure contemplates any suitable method for registering a user as an owner of a media-player device 320 including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
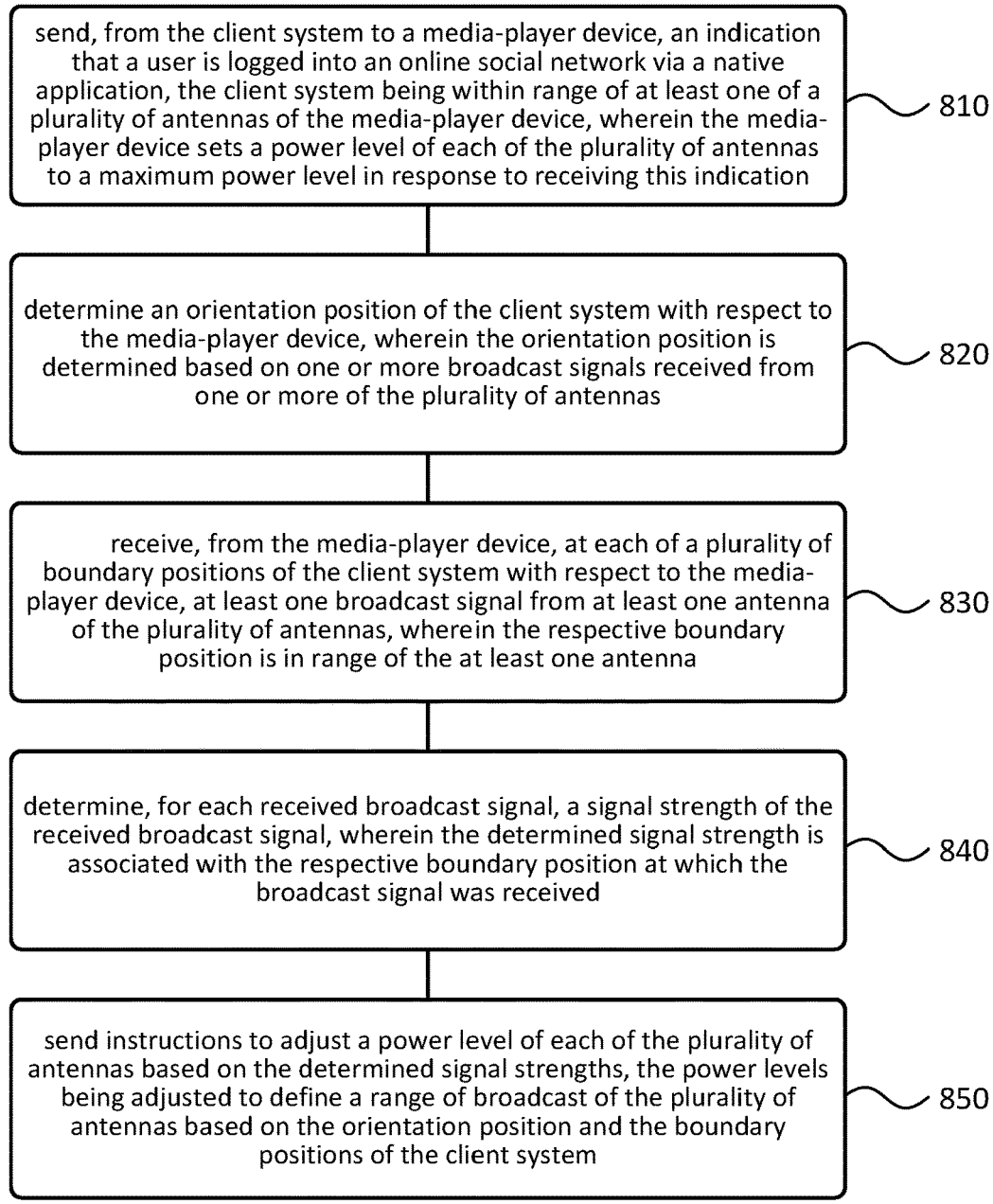
FIG. 8 illustrates an example method for sending instructions to adjust power levels of antennas to a media-device player.

FIG. 8 illustrates an example method 800 for sending instructions to adjust power levels of antennas 510A, 510B, 510C, and 510D to a media-device player 320. The method may begin at step 810, where client system 130 may send to a media-player device 320, an indication that the user is logged into social-networking system 160 via native application 330 associated with social-networking system 160, the client system 130 being within range of at least one of a plurality of antennas of the media-player device 320, wherein the media-player device 320 sets a power level of each of the plurality of antennas to a maximum power level in response to receiving this indication. At step 820, client system 130 may determine an orientation position of the client system with respect to the media-player device 320, wherein the orientation position is determined based on one or more broadcast signals received from one or more of the plurality of antennas. At step 830, client system 130 may receive, from media-player device 320, at each of a plurality of boundary positions of client system 130 with respect to media-player device 320, at least one broadcast signal from at least one antenna of the plurality of antennas, wherein the respective boundary position is in range of the at least one antenna. At step 840, client system 130 may determining, for each received broadcast signal, a signal strength of the received broadcast signal, wherein the determined signal strength is associated with the respective boundary position at which the broadcast signal was received. At step 850, client system 130 may send, to media-player device 320, instructions to adjust a power level of each of the plurality of antennas based on the determined signal strengths, the power levels being adjusted to define a range of broadcast of the plurality of antennas based on the orientation position and the boundary positions of client system 130. Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for sending instructions to adjust power levels of antennas 510A, 510B, 510C, and 510D to a media-device player 320 including the particular steps of the method of FIG. 8, this disclosure contemplates any suitable method for sending instructions to adjust power levels of antennas 510A, 510B, 510C, and 510D to a media-device player 320 including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 9:
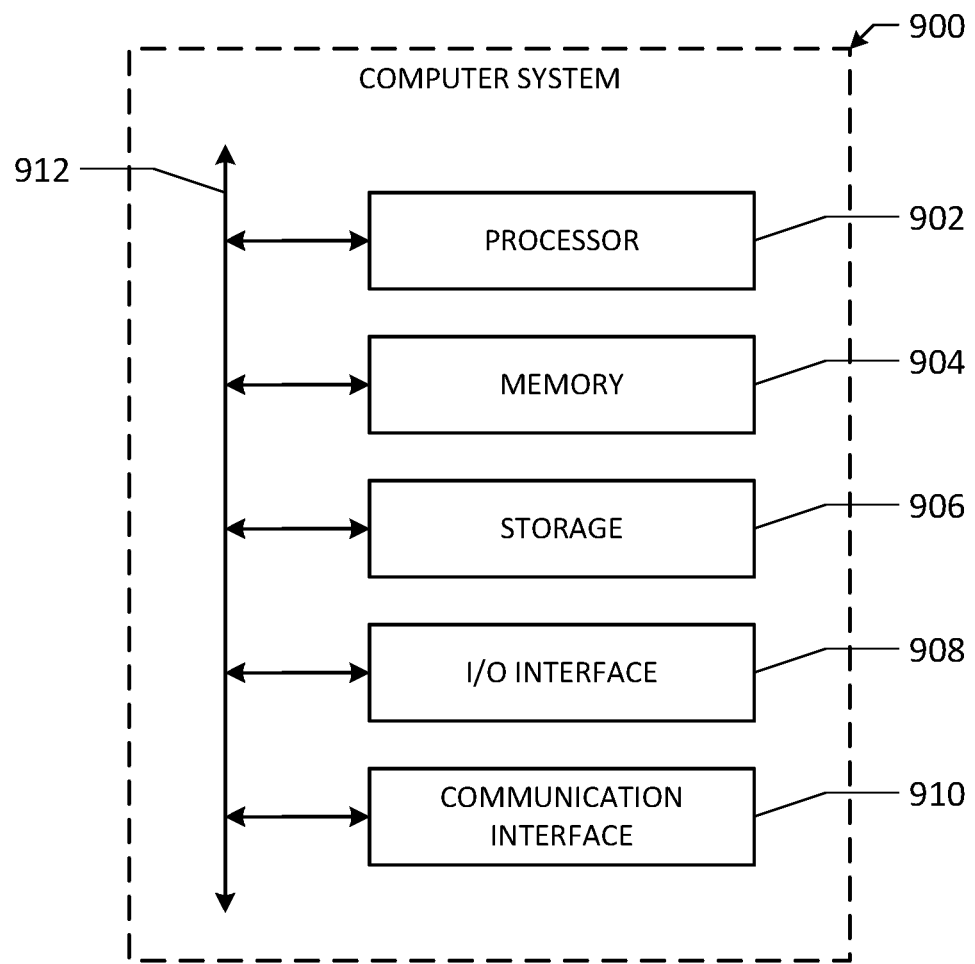
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by a media-player device:
    detecting, by the media-player device, that a client system of a user is within a wireless communication range of the media-player device, wherein the media-player device comprises a plurality of antennas;
    broadcasting, from the media-player device, an authentication key for the user of the client system;
    registering, by the media-player device, the user to the media-player device based on the authentication key being verified by the client system; and
    receiving, from the client system, instructions to adjust a power level of each of the plurality of antennas, the instructions being determined based on broadcast signals received at the client system and on a respective position of the client system associated with each received broadcast signal, wherein the respective position of the client system is determined with respect to a position of the media-player device.

2. The method of claim 1, wherein the user is registered as an owner of the media-device player.

3. The method of claim 1, wherein each of the plurality of antennas is a directional antenna.

4. The method of claim 3, wherein the plurality of antennas generate a radiation pattern in a first plane, and wherein the radiation pattern radiates in substantially 360-degrees of the first plane.

5. The method of claim 3, wherein the plurality of antennas comprises four antennas.

6. The method of claim 5, wherein the media-player device further comprises a fifth antenna, the fifth antenna being a bidirectional antenna.

7. The method of claim 6, wherein the fifth antenna generates a radiation pattern that radiates in a second plane, the second plane being substantially perpendicular to the first plane.

8. The method of claim 1, further comprising adjusting the power levels of each of the antennas of the plurality of antennas to define a range of broadcast based on the instructions received from the client system.

9. The method of claim 1, wherein the instructions to adjust the power level of each of the plurality of antennas are further based on a make and model of the client system.

10. The method of claim 1, wherein the instructions to adjust the power level of each of the plurality of antennas comprise instructions to adjust at least one of the plurality of antennas to zero based on no broadcast signal being received at the client system from the at least one antenna.

11. One or more computer-readable non-transitory storage media embodying software that is operable when executed to:
    detect, by the media-player device, that a client system of a user is within a wireless communication range of the media-player device, wherein the media-player device comprises a plurality of antennas;
    broadcast, from the media-player device, an authentication key for the user of the client system;
    register, by the media-player device, the user to the media-player device based on the authentication key being verified by the client system; and
    receive, from the client system, instructions to adjust a power level of each of the plurality of antennas, the instructions being determined based on broadcast signals received at the client system and on a respective position of the client system associated with each received broadcast signal, wherein the respective position of the client system is determined with respect to a position of the media-player device.

12. The media of claim 11, wherein the user is registered as an owner of the media-device player.

13. The media of claim 11, wherein each of the plurality of antennas is a directional antenna.

14. The media of claim 11, wherein the embodied software is further operable when executed to adjust the power levels of each of the antennas of the plurality of antennas to define a range of broadcast based on the instructions received from the client system.

15. The media of claim 11, wherein the instructions to adjust the power level of each of the plurality of antennas are further based on a make and model of the client system.

16. A system comprising: one or more processors; and a memory coupled to the processors comprising instructions executable by the processors, the processors operable when executing the instructions to:
    detect, by the media-player device, that a client system of a user is within a wireless communication range of the media-player device, wherein the media-player device comprises a plurality of antennas;
    broadcast, from the media-player device, an authentication key for the user of the client system;
    register, by the media-player device, the user to the media-player device based on the authentication key being verified by the client system; and
    receive, from the client system, instructions to adjust a power level of each of the plurality of antennas, the instructions being determined based on broadcast signals received at the client system and on a respective position of the client system associated with each received broadcast signal, wherein the respective position of the client system is determined with respect to a position of the media-player device.

17. The system of claim 16, wherein the user is registered as an owner of the media-device player.

18. The system of claim 16, wherein each of the plurality of antennas is a directional antenna.

19. The system of claim 16, wherein the processors are further operable when executing the instructions to adjust the power levels of each of the antennas of the plurality of antennas to define a range of broadcast based on the instructions received from the client system.

20. The system of claim 16, wherein the instructions to adjust the power level of each of the plurality of antennas are further based on a make and model of the client system.

* * * * *